G. B. SCHLEY.
SYSTEM OF ELECTRICAL DISTRIBUTION.
APPLICATION FILED APR. 30, 1909.
1,133,187.
Patented Mar. 23, 1915.
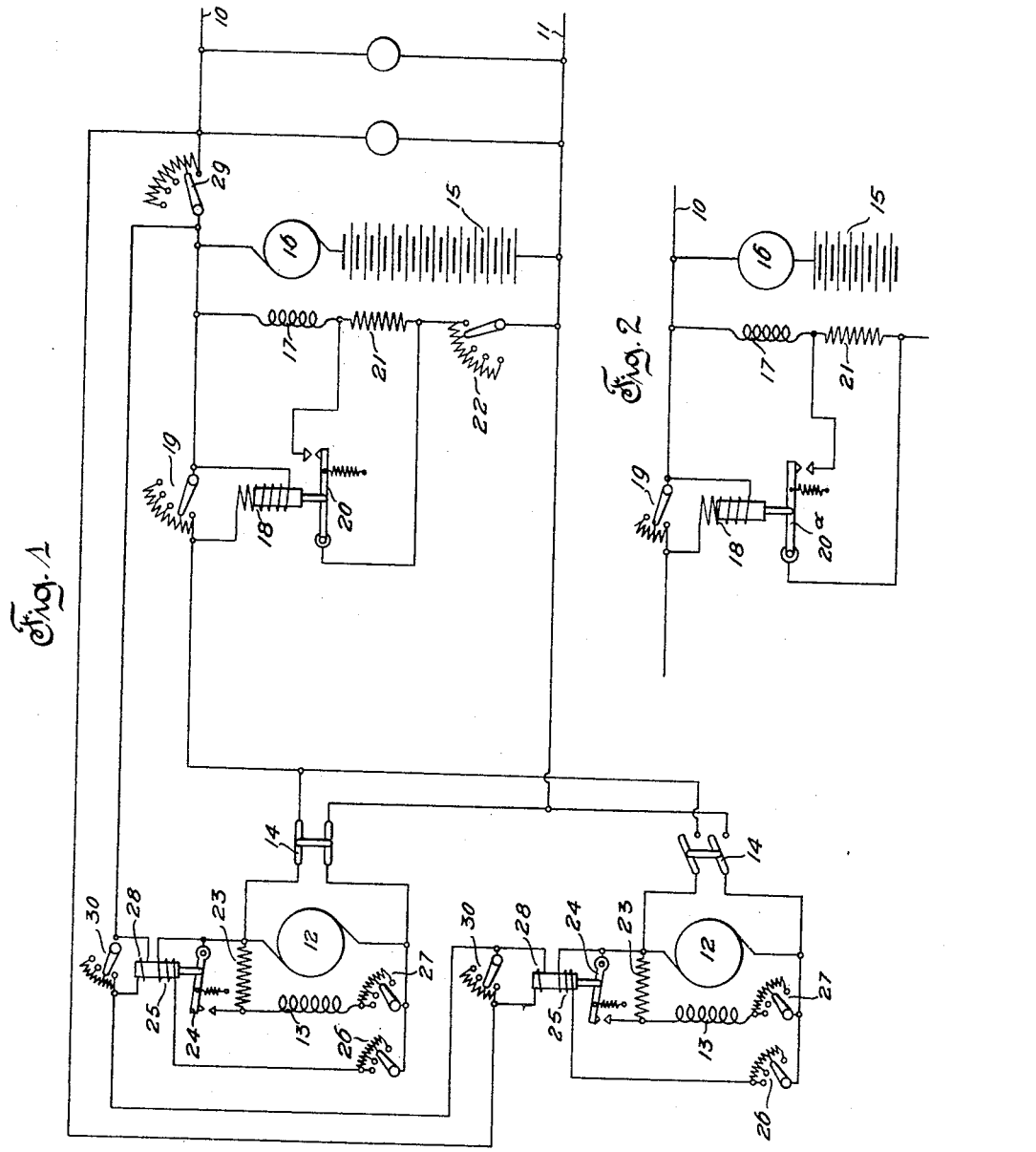

UNITED STATES PATENT OFFICE.

GEORGE B. SCHLEY, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SYSTEM OF ELECTRICAL DISTRIBUTION.

1,133,187.

Specification of Letters Patent. Patented Mar. 23, 1915.

Application filed April 30, 1909. Serial No. 493,071.

*To all whom it may concern:*

Be it known that I, GEORGE B. SCHLEY, a citizen of the United States, residing at Milwaukee, in the county of Milwaukee and State of Wisconsin, have invented certain new and useful Improvements in Systems of Electrical Distribution, of which the following is a full, clear and exact specification.

My invention relates to systems of distribution, and particularly to those systems in which a storage battery and booster are provided for the purpose of absorbing the fluctuations in the load.

In many systems of distribution the load varies between wide limits. Systems have been proposed in which some or all of the fluctuations in the load are absorbed by a battery and booster combination, the battery being charged when there is a light load on the system and discharging when there is a heavy load thereon. Although some of these systems have a compound wound generator as the main source of supply, there has been little or no compounding action; for as the systems have more nearly attained their object of maintaining constant the current supplied by the main generator, the current in the series winding of the generator has become less dependent on the current demanded by the load and the compounding effect of the series winding has diminished.

It is the object of my present invention to provide a system in which the current supplied by the main generator or generators of the system is effectively maintained substantially constant, and withal the generators have a compounding action and increase in voltage as the load on the system increases. With this object in view, my present invention provides an arrangement in which a circuit supplied by one or more generators has a storage battery and booster connected across it, and there is means for maintaining constant the current supplied by the generator or generators and for increasing the voltage of the latter as the load on the system increases.

The various novel features of my invention will appear from the description and drawings and will be pointed out in the claims.

Figure 1 shows diagrammatically one embodiment of my invention; and Fig. 2 shows a modification of the arrangement for controlling the booster field.

The circuit 10—11 is supplied by one or more generators 12, each of which has a shunt field winding 13. By means of switches 14 the several generators 12 may be connected to the circuit 10—11 separately or collectively, as the needs of the load require. A storage battery 15 and a booster armature 16 are connected in series across the circuit 10—11. The field 17 of the booster is arranged to be automatically regulated so that the battery and booster absorb all fluctuations of the load, thus maintaining the current supplied by the generator or generators 12 substantially constant. This regulation of the booster field is obtained by a coil 18 carrying a proportionate part of the current supplied by the generators 12, the ratio between the generator current and the current in the coil 18 being adjustable by a rheostat 19 in shunt to such coil. The coil 18 may control the booster field 17 in various ways.

As shown in Fig. 1, in which the booster 16 may be considered as being connected so as to assist the discharging of the battery 15, the coil 18 controls the switch 20, biased to open position and in shunt to a resistance 21 in series with the battery field 17. This switch is therefore closed upon a rise in the current supplied by the generator, and opens upon a fall in such current. The resistance 21 is of such value that its cutting out so increases the current in field 17 that the booster and battery discharge furnish current to the load. The effect of the booster and battery discharge is such as to bring the generator current to approximately normal value, allowing the switch 20 to move to open position. The switch 20 keeps up a practically continuous vibration, being responsive to the slightest increment of load increase, a small increase in load having the same effect as a large one in closing this switch to increase the booster voltage and cause the battery to discharge and carry that portion of the load in excess of normal.

As a substitute for the regulating means shown in Fig. 1, the arrangement of Fig. 2 may be used, where the booster 16 is connected to assist the charging of the battery 15. In this case, the coil 18 is arranged to control a switch 20ª, biased to closed position and in shunt to the resistance 21. This switch is opened whenever the current supplied by the generator rises, and closes whenever the generator current falls. The resistance 21, in this case also, is of such value that, when the short-circuit is removed from the field, the latter is so decreased that the battery is allowed to discharge to maintain the generator current constant. As in the case of the switch 20, the switch 20ª is kept in practically continuous vibration, being responsive to slight as well as to great overloads on the line.

It will be apparent that, in the booster and battery regulator of either Fig. 1 or Fig. 2, the winding of field 17, being supplied from the constant current circuit of the generator or generators 12, will exert a similar energizing effect for all load values below normal, that is, at instants of closure of switch 20 or 20ª. As soon as the load rises above normal to any extent, small or great, the switch 20 or 20ª is operated to change the energizing effect of the winding of field 17 through the removal or insertion of the field resistance 21, depending upon whether the arrangement of Fig. 1 or Fig. 2 is used. The winding of field 17 will have another similar energizing effect at all instants when the switch 20 or 20ª is in open condition. The only factor affecting the value of the field current is the presence or absence of the short-circuit about the field resistance 21. It will be obvious from this that, as the effect of the winding of field 17 will be the same for each similar operation of the switch 18 or 18ª, the resultant voltage at the booster terminals will depend on the rate of vibration of the switch 18 or 18ª.

It will be obvious that, with the field 17 and the resistance 21 properly chosen, the combined booster and battery voltage, when the resistance 21 is short-circuited, exceeds the normal line voltage. With such an arrangement, the generator is immediately relieved of any excess current; and further, that this generator current, in either case, is not proportionate to the load, for the booster and battery act immediately, on any overload, to cause the battery to furnish the surplus energy, making the generator current practically constant, with only such increase as is necessary to operate the switch 20 or 20ª, the battery discharging as effectively for a light overload as for a heavy overload.

It will be apparent that the booster and battery and controlling means therefor, of either Fig. 1 or Fig. 2, may be used for regulating the current of the supply generator or generators 12.

By means of the coil 18 and the switch controlled thereby, the current supplied by the generator or generators 12 is maintained almost absolutely constant, and the current taken by the load on the circuit 10—11 is the algebraic sum of the current supplied by the generator or generators 12 and the battery 15. If desired, a manually operated rheostat 22 may be provided in the circuit of the booster field coil 17.

Each of the generators 12 is provided with an automatic voltage regulator. In the arrangement illustrated this voltage regulator takes the form of a resistance 23 in the circuit of the field coil 13, and a switch 24 in shunt to such resistance and when closed short-circuiting the latter. This switch is biased to closed position, and is arranged to be opened by a voltage coil 25 whenever the voltage of the generator rises above the normal. This normal may be adjusted by a manually operated rheostat 26, and another manually operated rheostat 27 may be placed in the circuit of the field coil 13. The switch 24, like the switch 20 or 20ª, is extremely sensitive in its operation, and it keeps in practically continuous vibration to maintain the voltage of the generator it controls almost absolutely constant.

A coil 28 opposing the coil 25 helps to control the movements of the switch 24. This coil carries a proportionate part of the current supplied to the circuit 10—11, a manually operated rheostat 29 being provided to vary collectively the proportionate part of the current taken by the coils 28, and a manually operated rheostat 30 for each coil 28 for varying the proportionate part taken by that coil individually. As the current demanded by the load on the circuit 10—11 rises, the coils 28 diminish the effect of the coils 25, and the field regulators of the generators 12 cause such generators to operate at a higher voltage. By this means, a compounding action of the generators 12 is obtained, although the current supplied by such generators is maintained practically constant.

It will be apparent that the booster regulator, whether the same is of the form shown in Fig. 1, where the booster acts to assist the discharge of the battery and the short circuit about the field resistance 21 is normally open at the switch 20, or of the form shown in Fig. 2, where the booster assists in charging the battery and the short-circuit about the field resistance 21 is normally closed at the switch 20ª, acts to maintain an approximately constant output of the generator or generators 12; and, further, that the automatic voltage regulator on the generator or generators, at the same time, raises the voltage of the generator or generators as the load increases.

The operation of either booster regulator is to cause the battery and booster to furnish the surplus demanded by the load when the same is heavy or to absorb the surplus of the generator when the load is light. As the load increases, the excessive current being furnished by the battery and booster, the effect of the coil 25, in maintaining the short-circuit about the field resistance 23 open, is decreased by the action of the coil 28 carrying current proportionate to the load current. Thus, as the load increases, a higher generator voltage is necessary to open the short-circuit about the field resistance 23. As the regulator is so designed that the maximum voltage desired for the greatest load can be secured with the field resistance 23 short-circuited, and as the periods of short-circuiting of this resistance will be greater, on account of the action of the coil 28, carrying current proportional to the load, a properly increasing voltage may be had, such as will fully compensate for the increased line drop. It will be apparent then that the combined booster and voltage regulator provides an arrangement whereby the current output of the generator or generators may be maintained constant and the voltage of the generator or generators may be varied so as to compensate for varying line drop due to varying loads on the system.

Many modifications may be made in the precise arrangements here shown and described, and all such which do not depart from the spirit and scope of my invention I aim to cover in the following claims.

What I claim as new is:—

1. In a system of distribution, a generator, a circuit connected thereto, a battery and booster connected in series across said circuit, means for causing the battery and booster to absorb the fluctuations in the load and to maintain the current supplied by the generator substantially constant and without fluctuations proportionate to those of the load, and a regulating device for the field winding of the generator for causing the voltage of the generator to rise and fall as the load on the circuit increases or decreases.

2. In a system of distribution, a generator, a distribution circuit connected thereto, a storage battery and booster connected in series across said circuit between the generator and the load, means for controlling the booster field to cause the battery to absorb the fluctuations in the load and to maintain the current supplied by the generator substantially constant without fluctuations proportionate to those of the load, and a regulator for the generator field controlled by one coil carrying a current proportional to the current demanded by the load and another coil responsive to the voltage of the generator.

3. In a system of distribution, a generator, a distribution circuit supplied thereby, a storage battery and booster connected in series across said circuit, a coil carrying a current proportional to that delivered by said generator, means controlled by said coil for regulating the booster to cause the battery to absorb all fluctuations in the load on the distribution circuit and to maintain the generator current substantially constant and without fluctuations proportionate to those of the load, and a regulating device for the field winding of the generator, which regulating device is controlled in response to the current demanded by the load.

4. In a system of distribution, a generator, a distribution circuit supplied thereby, a storage battery and booster connected in series across said circuit, a coil carrying a current proportional to that delivered by the generator, means controlled by said coil for regulating the booster to cause the battery to absorb all fluctuations in the load on the distribution circuit and maintain the generator current substantially constant and without fluctuations proportionate to those of the load, and a regulating device for the field winding of the generator, which regulating device is provided with two coils, one responsive to the voltage of the generator, and the other to the current demanded by the load.

5. In a system of distribution, an external circuit, a generator having armature and field windings and connected to said external circuit, boosting means connected across the generator circuit between the generator and said external circuit, means for controlling the boosting means including a relay operative to cause the boosting means to absorb the fluctuations in the load on the external circuit to maintain the current supplied by the generator substantially constant, and regulating means for the generator field including a relay provided with two coils carrying opposing currents, the current in one coil being proportional to the load on the external circuit and the current in the other coil being responsive to the voltage of the generator.

6. In a system of distribution, a generator, a circuit supplied thereby, means for absorbing fluctuations in the load on said circuit and maintaining the current supplied by said generator substantially constant, and means associated with the field of said generator and operative in response to changes in said load for causing the voltage of said generator to vary in the same sense as said load.

Milwaukee, Wis., Apr. 16, 1909.

In testimony whereof I affix my signature, in the presence of two witnesses.

GEORGE B. SCHLEY.

Witnesses:
H. C. CASE,
CHAS. L. BYRON.